United States Patent [19]
Fingerle et al.

[11] Patent Number: 4,778,265
[45] Date of Patent: Oct. 18, 1988

[54] BREAKAWAY/SWINGAWAY TRUCK MIRROR

[75] Inventors: Robert F. Fingerle; Richard D. Chapman, both of Fremont, Calif.

[73] Assignee: Paccar Inc., Bellevue, Wash.

[21] Appl. No.: 92,577

[22] Filed: Sep. 3, 1987

[51] Int. Cl.$^4$ .......................... B60R 1/06; G02B 7/18; G02B 5/08
[52] U.S. Cl. .................................... 350/604; 350/632; 248/549; 248/900; 248/486
[58] Field of Search .................. 350/604, 632, 631; 248/900, 549, 486, 475.1, 476

[56] References Cited

U.S. PATENT DOCUMENTS 3,887,156  6/1975  Hugonnier .................. 248/549

FOREIGN PATENT DOCUMENTS

| 3608 | 2/1979 | European Pat. Off. | 248/900 |
| 2546759 | 4/1977 | Fed. Rep. of Germany | 248/900 |
| 2744708 | 4/1979 | Fed. Rep. of Germany | 248/486 |
| 1245737 | 10/1960 | France | 248/900 |

Primary Examiner—Jon W. Henry
Attorney, Agent, or Firm—Flehr, Hohbach, Test, Albritton & Herbert

[57] ABSTRACT

A breakaway/swingaway mirror mounting assembly is provided that conveniently attaches to the side of a vehicle's door panel. The mirror assembly includes a mounting plate, a breakaway swing plate, a mirror strut, and a mirror. The mounting plate is securely fastened to the vehicle in a conventional manner. The mirror strut and the mirror are conventional but instead of attaching directly to the mounting plate, the mirror strut attaches to the swing plate. The improvement in the present invention relates to the attachment of the swing plate to the mounting plate. An attachment means for releasably engaging the mirror assembly to the mounting plate is provided. The attachment means preferably includes a pair of bolts each having an associated rubber bushing. The bolts attach to the swing plate while the bushings are press fit into the mounting plate. Upon sustaining any substantial impact, the bushings pop free from the mounting plate thereby allowing the mirror assembly to swing or breakaway.

10 Claims, 2 Drawing Sheets

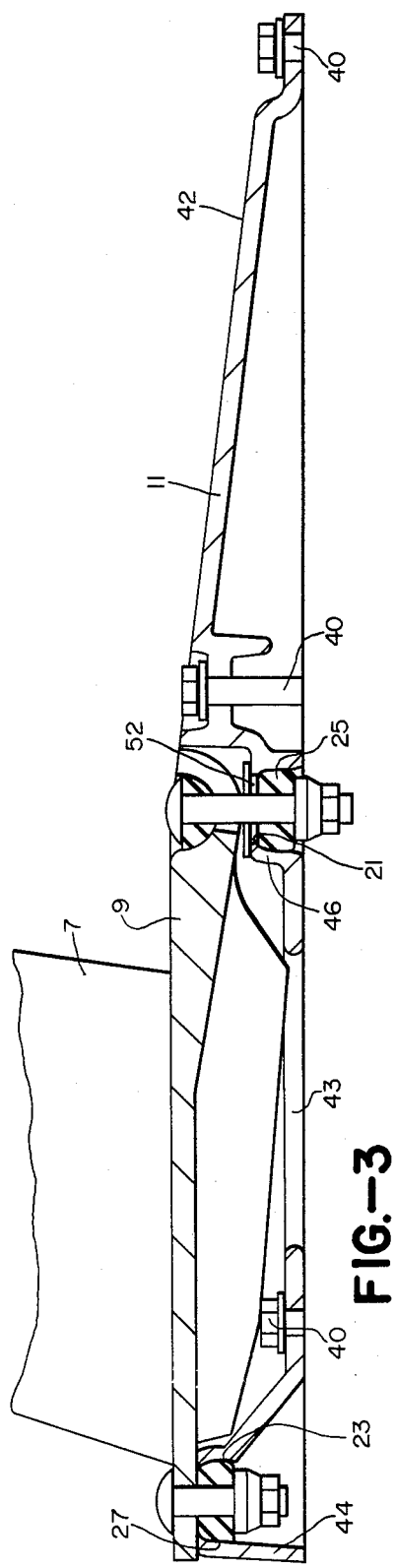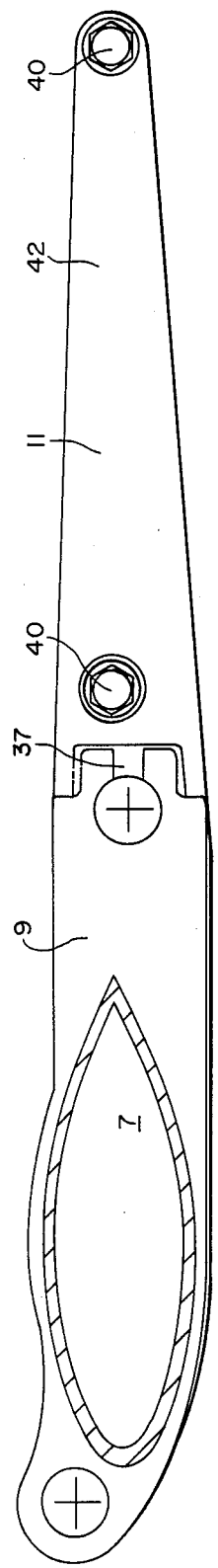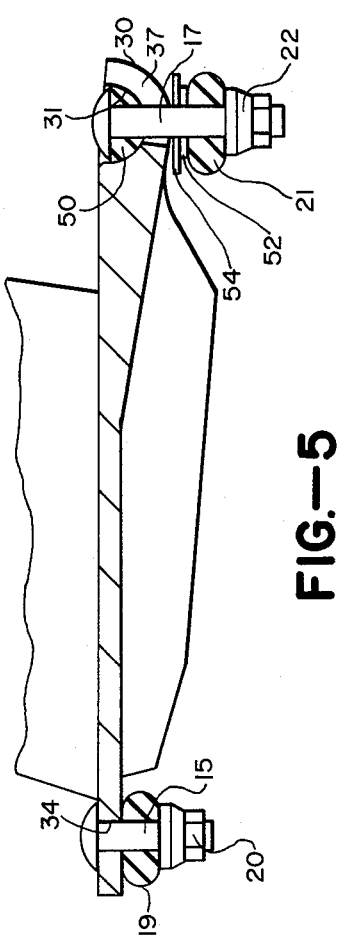
FIG.—3
FIG.—4
FIG.—5

BREAKAWAY/SWINGAWAY TRUCK MIRROR

The present invention relates generally to an improved mirror unit for trucks that will not be destroyed every time it gets hit. More particularly, the present invention relates to a mounting system for a truck mirror that will allow the mirror to pop loose from its mounting and swing free when it is struck at low speeds.

Most motorized road vehicles including both commercial trucks and passenger vehicles have side view mirrors that extend outwardly from the vehicle's side. Although side view mirrors are essential from a safety standpoint, they are extremely vulnerable to striking, or being struck by, foreign objects. This problem is particularly noteworthy on trucks and trailer pulling vehicles since their mirrors typically extend a great distance to the vehicle's side. Within the trucking industry there is a constant need to maneuver large trucks in relatively tight places. All too frequently the mirrors extending from the side of the cab strike walls, vehicles, or other obstructions. Conventional mirrors are securely bolted to the vehicle's side, most commonly on the doors. Thus, even when a mirror unit is impacted at relatively low speeds, damage frequently occurs to the door, the mirror frame, and/or the mirror itself. Thus it would be desirable to create a mirror mounting structure that nondestructively breaks away from the door panel rather than being sheared off when the mirror is impacted at relatively low speeds.

Additionally, in many circumstances, such as when a truck is maneuvered in tight places, it is desirable to "break down" the mirror unit in order to narrow the effective width of the cab. Conventional mirrors require disassembly of the mounting structure before the effective width of the truck can be reduced. Thus, it would also be desirable to provide a mirror mounting structure that allows the mirrored unit to simply and easily be removed to reduce the truck's effective footprint.

Accordingly, it is one object of the present invention to provide a truck mirror unit that effectively breaks away from the door or panel on which it is mounted, when the unit is impacted by a foreign object.

Another object of the present invention is to provide a mirror mounting structure that allows the mirror unit to be conveniently collapsed to provide a narrower footprint to accommodate maneuvering in tight places.

To achieve the foregoing and other objects and in accordance with the purpose of the present invention, a breakaway/swingaway mirror mounting assembly is provided that conveniently attaches to the side of a vehicle's door panel. The mirror assembly includes a mounting plate, a breakaway swing plate, a mirror strut and the mirror. The mounting plate is securely fastened to the vehicle in a conventional manner, preferably through the use of a plurality of bolts. The mirror strut and the mirror are conventional but instead of attaching directly to the mounting plate, the mirror strut attaches to the swing plate. The improvement in the present invention relates to the attachment of the swing plate to the mounting plate. An attachment means for releasably engaging the mirror assembly to the mounting plate is provided. Under normal operating conditions, the mirror assembly remains securely in place. However, when the mirror assembly is impacted with sufficient force to cause damage, the attachment means allows the mirror assembly to break free, without the sacrifice of any parts, before any damage is caused.

Preferably, the attachment means includes a pair of bolts, each having an associated rubber bushing. The bolts attach to the swing plate while the bushings are press fit within the mounting plate. Upon sustaining any substantial impact, the bushing pops free of the mounting plate thereby allowing the mirror assembly to swing or break away.

The features of the present invention which are believed to be novel are set forth with particularity in the appended claims. The invention, together with further objects and advantages thereof, may best be understood by reference to the following description taken in conjunction with the accompanying drawings, in which:

FIG. 3 is a cut-away bottom elevational view of the mirror mounting arrangement shown in FIG. 1;

FIG. 4 is a side view of the mounting arrangement shown in FIG. 1 cutting away through the mirror strut.

FIG. 5 is a cut-away bottom view of the swing plate shown in FIG. 3 standing alone.

Figure 1:
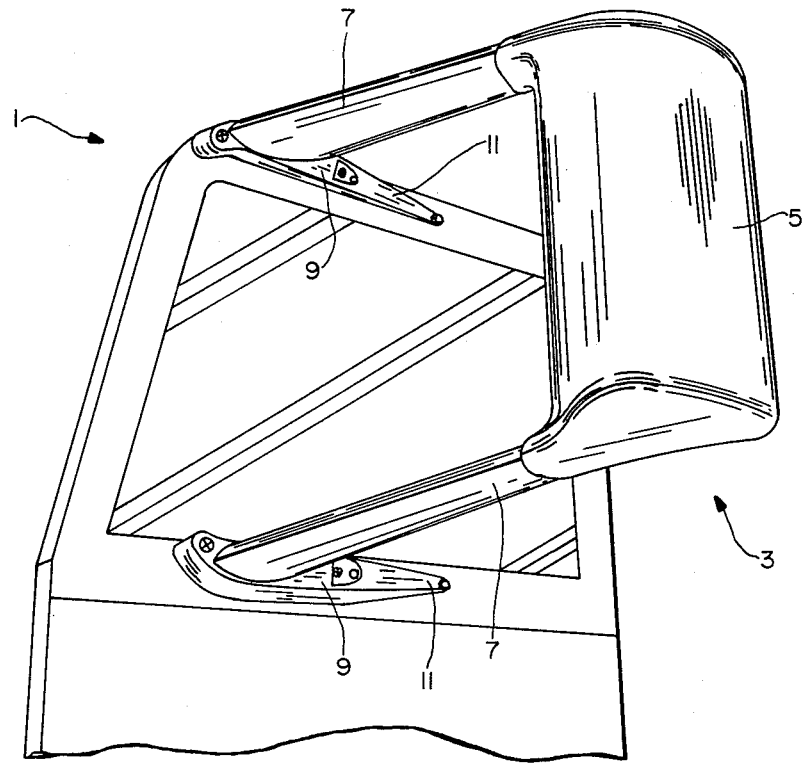
FIG. 1 is a perspective view of an embodiment of the present invention attached to the door of a conventional cab in its natural operating position.
Figure 2:
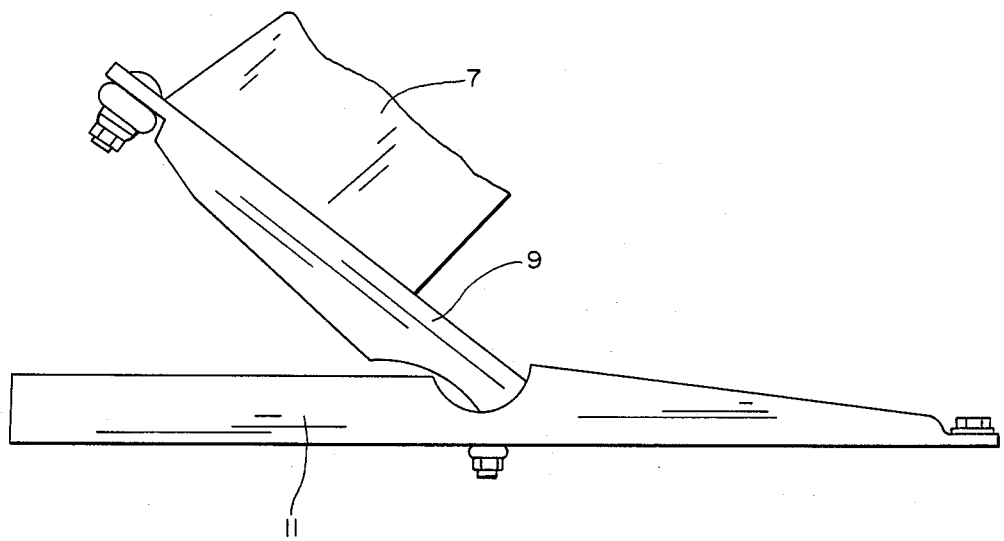
FIG. 2 is a bottom elevational view of the mirror mounting arrangement shown in FIG. 1 after the swing plate has been broken loose from the mounting.

As illustrated in the drawings, the releasable mirror assembly 1 includes mirror unit 3 having a mirror 5, a pair of struts 7 and a swing plate 9. The swing plate 9 is releasably attached to a mounting plate 11 which is securely fastened to the side of a vehicle.

Referring specifically to FIGS. 3 and 5, the means by which the mirror unit 3 is releasably attached to mounting plate 11 will be described. A pair of studs which in this embodiment take the form of bolts 15 and 17 directly engage the swing plate 9 and extend into the interior of mounting plate 11. However, instead of directly engaging mounting plate 11, bolts 15 and 17 each have an associated rubber bushing, 19 and 21 respectively. Nuts 20 and 22 threadably engaged bolts 15 and 17 respectively to retain their corresponding bushings 19 and 21. The rubber bushings 19 and 21 are arranged such that they will pop away from mounting plate 11 when the mirror unit 3 sustains an impact of significant force. Bolts 15 and 17 are shouldered to restrict the travel of nuts 20 and 22. Thus, they will always tighten to the same point ensuring that the bushings will always be defored to the same extent.

The embodiment shown in the drawings and described in detail herein is designed to have the front end break completely free while pivoting freely about the rear end when an impact is received on the front of the mirror unit. When the mirror unit receives an impact from the rear, the rear bolt pops free and the mirror unit pivots about the front bolt. However, the mirror unit will only swing in the neighborhood of 35 to 45 degrees forward after breaking away under the influence of an impact from the rear. The failure of the device to swing completely free when the mirror unit receives an impact from the rear side is not of particular concern since such impacts are normally received when the vehicle is being packed up and maneuvered into tight places. In such situations, the driver upon hearing the impact and the noises of the mirror unit 3 popping loose should have adequate time to stop and prevent further damage to the mirror unit and the mounting structure.

As can be best seen in FIG. 3, mounting plate 11 includes a pair of apertures 23 and 25 designed to receive bolts 15 and 17, respectively. Apertures 23 and 25 are substantially wider than the shanks of their corresponding bolts. Mounting plate 11 forms lips 27 about the outside portions of apertures 23 and 25, thereby creating in effect a constriction. Bushings 19 and 21 are designed to be tightly received within apertures 23 and 25 respectively just underneath the lips 27 formed by mounting plate 11. Thus, under normal operating conditions, bolts 15 and 17 extend from swing plate 9 into apertures 23 and 25 where they are received by bushings 19 and 21. Once the nuts are tightened, bushings 19 and 21 are firmly held within apertures 23 and 25 respectively by the lips 27 formed in mounting plate 11 as well as the frictional engagement with the sides of apertures 23 and 25. However, since the bushings are formed from a suitable compressible material such as rubber, if the mirror unit 3 is struck by a substantial impact force, bushings 19 and 21 are capable of popping free from mounting plate 11 when necessary.

To install the swing plate 9, bolts 15 and 17 are positioned on the swing plate 9 and bushings 19 and 21 are installed over the end of the bolts. Nuts 20 and 22 are then drawn such that they press against bushings 19 and 21 without substantially compressing the bushings. The busings are sized such that they may be received by apertures 23 and 25 through lips 27 without undue force. After the bushings have been inserted into their respective apertures, the bolts 15 and 17 are rotated. Friction between bushings 19 and 21 and their respective nuts 20 and 22 restrict the nuts rotational movement, thereby causing the nuts to be drawn up the shaft of bolts 15 and 17 and longitudinally compressing bushings 19 and 21. The longitudinal compression causes bushings 19 and 21 to bulge radially and firmly engage the walls of apertures 23 and 25. Bolts 15 and 17 are shouldered. Thus, as nuts 20 and 22 are tightened, they are drawn into abutting relationship with the shoulders which thereby control the radial expansion of bushings 19 and 21. It will be appreciated that this arrangement will provide a secure mounting for the mirror unit 3.

If the mirror unit 3 is struck with sufficient impact to cause swing plate 9 to pop free of mounting plate 11, the mirror may be easily reinstalled by backing bolts 15 and 17 off to eliminate the radial bulge in bushings 19 and 21. The swing plate may then be remounted as described above. It will be appreciated that the mirror unit can quickly and easily be swung clear disassembled to facilitate maneuvering in tight places by backing-off bolt 15 and rotating the mirror unit 3 until it presses against the side of the door. Alternatively, both bolts 15 and 17 could be backed off and the entire mirror unit 3 could be removed.

Referring specifically to FIG. 5, swing plate 9 has a rounded trailing end 30 and a substantially semi-spherical hollow 31 adapted to receive bolt 17 and being substantially aligned with aperture 25. Hollow 31 is also substantially concentric with rounded trailing edge 30. As can best be seen in FIGS. 4 and 5, a slot 37 that is sized to receive the shank of bolt 17 but not the bolt head, extends from a forward position aligned with bolt 17 to the rear end of swing plate 9. Swing plate 9 also includes bore hole 34 which is aligned substantially with aperture 23 and is sized just large enough to receive the shaft of front bolts 15.

Strut 7 is attached to swing plate 9 by any conventional means including welding, screws, or any other mounting mechanism.

Mounting plate 11 is attached to the side of a vehicle by a plurality of bolts 40. To give the mirror assembly 1 an overall pleasing aesthetic look, and to provide compatibility with current mirror mounting structure, mounting plate 11 has a rear portion 42 that extends from its back surface towards the front at an angle away from the vehicle. The front portion 43 of mounting plate 11 has the appearance of an extended recess within raised sidewalls and having an elevated post 44 at its front end. The recessed front portion 43 of mounting plate 11 is adapted to receive swing plate 9, such that the front end of the swing plate 9 rests against the post 44 of mounting plate 11. The visual appearance of mirror assembly 1 is that mounting plate 11 and swing plate 9 merge smoothly together. Mounting plate 11 also includes a slightly elevated rear post 46 which is essentially formed about aperture 25. Front post 44, in turn, is formed about aperture 23 with the tops of the respective posts forming the aforementioned lips 27.

The remainder of the attachment means between swing plate 9 and mounting plate 11 will be described with reference to FIGS. 3 and 5. Bolt 17 is either associated with a substantially semi-spherical washer 50 that is received within semi-spherical hollow 31 or the washer is integrated into the bolt head. A locating washer 52 is disposed within aperture 25 in rear post 46 at the level of lip 27 to restrain the top of rear bushing 21. A backing washer 54 is placed over the top of rear post 46 and closely receives the shank of bolt 17. Backing washer 54 is intended to provide a surface on which swing plate 9 may rotate.

When a substantial impact force is received on the front of mirror unit 3, front bushing 19 pops free from front post 44 of mounting plate 11. Since slot 37 is wide enough to receive the shaft of rear bolt 17, swing plate 9 rotates about backing washer 54 with the spherical washer 50 rotating within hollow 31 and the shaft of bolt 17 passing through slot 37. With this construction, the head portion of mirror 5 will hit the side of the cab before the mirror unit 3 has rotated far enough for swing plate 9 to become free of bolt 17. Thus, the mirror unit 3 will swing out of the way of an object after being struck, but it will not fall off of mounting plate 11.

The embodiment shown in the drawings is designed to only allow mirror unit 3 to swing approximately 40 degrees when it is impacted from behind. When struck from behind, rear bushing 21 pops free from rear post 46 and rotation occurs about front bolt 15 since front bushing 19 is compressible. However, there is not enough clearance for front bushing 19 to swing freely when the impact is sustained from behind. This is not considered to be a problem since the vast majority of blows to the back of the mirror occur while the truck is being backed up and hence occur at relatively low speeds. Thus, I have found that drivers typically have adequate time to stop before structural damage is done to either the mirror or its mounting. It should be understood that the swinging structure as described with relation to the back bolt could just as easily be applied to the environment of both the front and the back sides of the mounting structure.

Although only one embodiment of the present invention has been described herein, it should be understood that the present invention may be embodied in many other specific forms without departing from the spirit or scope of the invention. Therefore, the present examples and embodiments are to be considered as illustrative and not restrictive, and the invention is not to be limited to the details given here, but may be modified within the scope of the appended claims.

We claim:

1. A breakaway mirror assembly for attachment to the side of a motorized vehicle, the mirror assemlby comprising:

a detachable mirror unit including a mirrored surface;

a swing plate including a first rounded end, a rounded hollow that is substantially concentric with said rounded end, an open slot that directly communicates with said hollow and passes through said rounded end, and a borehole, said swing plate being securely fastened to said mirrored surface;

mounting means for attaching said mirror unit to said motorized vehicle;

a first stud that passes through said open slot to fasten the swing plate to the mounting means ; and a second stud that passes through said borehole to fasten the swing plate to the mounting means , each said stud having an associated compressible bushing for coupling said swing plate to said mounting means, wherein said bushings are sized and shaped for being tightly received by said mounting means;

whereby when the mirror unit receives a substantial impact on its forward surface, the second stud and bushing arrangement pops free of said mounting plate and said swing plate pivots about its rounded end with said first bolt passing through said open slot.

2. A breakaway mirror assembly as recited in claim 1 wherein said mounting means includes a mounting plate having a first and a second lipped post for releasably receiving said bushing and studs.

3. A breakaway mirror assembly as recited in claim 2 wherein said first and second studs are threaded bolts.

4. A breakaway mirror assembly as recited in claim 1, further comprises a backing washer for disposition between said rounded end of said swing plate and said mounting means to provide a surface on which said swing plate can be rotated.

5. A breakaway mirror assembly as recited in claim 1 wherein said bushings are rubber.

6. A breakaway mirror assembly for attachment to the side of a motorized vehicle, the mirror assembly including:

a mirror unit including a reflecting mirror and a strut for carrying the reflecting mirror;

a swing plate secured to the base of said strut; said swing plate having a first rounded end and a second end and including a hollow aligned substantially concentrically with said rounded end, an open slot in direct communication with the hollow and a borehole;

a mounting plate secured to the side of a motorized vehicle and including first and second mounting plate apertures; and attachment means for releasably connecting said swing plate to said mounting plate, said attachment means including first and second studs each having an associated compressible bushing adapted for snug reception by said first and second mounting plate apertures respectively, wherein said first stud passes through said open slot and said second stud passes through said borehole to fasten said swing plate to said mounting plate, whereby when the mirror unit receives a substantial impact on its forward surface, the second stud and bushing arrangement pops free of said mounting plate and said swing plate pivots about said rounded end with said first stud bolt passing through said open slot.

7. A breakaway mirror assembly as recited in claim 6 wherein said bushings are rubber.

8. A mirror assembly as recited in claim 6, further comprises a backing washer for disposition between said rounded end of said swing plate and said mounting plate to provide a surface on which said swing plate can be rotated.

9. A breakaway mirror assembly as recited in claim 6 wherein said hollow is substantially semi-spherical and said first stud includes a semi-spherical head sized to fit within said hollow for facilitating rotation between said first stud and said swing plate.

10. A breakaway mirror assembly as recited in claim 6 wherein said hollow is substantially semi-spherical and the mirror assembly further comprises a semi-spherical washer sized to fit within said hollow for facilitating rotation between said first stud and said swing plate.

* * * * *